United States Patent [19]

Amos et al.

[11] Patent Number: 4,885,452
[45] Date of Patent: Dec. 5, 1989

[54] EXOTHERMIC WELDING AND METHOD

[75] Inventors: Michael D. Amos, Burton; David P. Kovarik, Eastlake; George F. Kub, Jr., Northfield, all of Ohio

[73] Assignee: Erico International Corporation, Solon, Ohio

[21] Appl. No.: 177,076

[22] Filed: Apr. 4, 1988

[51] Int. Cl.$^4$ .............................................. B23K 9/06
[52] U.S. Cl. .................................. 219/130.4; 228/241
[58] Field of Search ...................... 219/130.4; 228/241; 266/227; 361/251, 253, 256; 102/202.8; 206/568

[56] References Cited

U.S. PATENT DOCUMENTS

| | | | |
|---|---|---|---|
| 3,020,610 | 2/1962 | Rejdak | 228/241 |
| 3,955,505 | 5/1976 | Johnston | 102/202.8 |
| 4,182,947 | 1/1980 | Brower | 219/130.4 |

*Primary Examiner*—Clifford C. Shaw
*Attorney, Agent, or Firm*—Renner, Otto, Boisselle & Sklar

[57] ABSTRACT

Exothermic reaction mixtures are economically ignited remotely and electrically without the use of a low ignition starting material by creating a predetermined spark gap within a matrix of such mixture and then impressing a high energy spark across the gap through the use of a capacitor discharge circuit. The mixture is contained in a graphite or ceramic vessel or crucible and is supported over a tap hole or runner by a fusible metal disk. The material of the vessel is preferably graphite which is electrically conductive. In one form of the invention, an insulated wire with a bare tip is positioned just below the top surface of the mixture and the tip spaced a predetermined distance from the wall of the vessel. The capacitor discharge circuit is then employed to fire a high energy spark through a matrix of the material across the gap formed between the wire and vessel to initiate the reaction. In another form the spark gap may be established in a small cylindrical cartridge containing the material. The cartridge may be positioned through a hole in the side wall of the mold just below or near the top of the exothermic material so that it can be filled with the material from the main body of the exothermic material.

60 Claims, 3 Drawing Sheets

EXOTHERMIC WELDING AND METHOD

This invention relates generally as indicated to exothermic welding and method and more particularly to an apparatus and method utilizing reliable remote ignition without starting materials.

BACKGROUND OF THE INVENTION

Exothermic welding compositions are employed to produce a wide variety of electrical and mechanical joints. Such compositions and the apparatus for using such compositions are sold by Erico Products Inc. of Solon, Ohio, U.S.A. under the trademark CADWELD.

In the process of use, typically, a graphite mold which includes a crucible encloses the parts to be joined. A weld cavity surrounds the parts to be joined and is connected to the bottom of the crucible by a tap hole. One or more steel disks close the bottom of the crucible. Exothermic material is then placed in the crucible and is covered by a layer of low ignition starting material. When the crucible is closed the starting material is ignited through the use of a spark ignitor. The starting material in turn starts the exothermic reaction which converts the material to molten metal and slag which rises to the top. The molten metal then melts through the disk and permits the molten weld metal to pass through the tap hole to fill the weld cavity.

In some situations it is desirable to remotely ignite the mixture. Also, the handling, shipping and preparatory process for the use of the starting material makes desirable an exothermic ignition process which would avoid the use of the starting material.

For years exothermic materials have been ignited by a hot wire process. Such hot wire process has several drawbacks. One of those drawbacks is reliability. It has been found that in order for ignition to occur, the wire must transfer enough heat to the material before it fuses. If the wire fuses and ignition doesn't occur then the wire has to be replaced, reconnected and properly positioned in the exothermic material. Although coils, lengths, or other patterns may be employed throughout the mixture such as seen in French patent specification No. 324,534 to Weber, because of the fusion of the wire, ignition, if it occurs at all, will normally occur only at a single point in the mixture. In some exothermic processes single point ignition may be acceptable. However, to produce a quality weld random single point ignition is not acceptable.

Other attempts at electrical ignition have been made, one utilizing highly esoteric and, of course, expensive solid rocket igniters such as shown in the copending application of Dennis Brosnan et al entitled "Exothermic Welding Apparatus and Method", filed Mar. 25, 1987, U.S. Ser. No. 030,169. Such igniters, unless modified or duplicated, again expensively, provide only single point ignition.

In conventional welding applications as indicated the starting material is spread over the top of the weld metal which is contained in the crucible section of the mold. When the starting material is ignited the exothermic material is ignited at the top and the reaction moves downwardly forming such molten metal and slag. When the molten metal reaches the disk and sufficiently elevates its temperature, the disk melts and the molten metal drops through the tap hole to the weld cavity.

In a proper process a delay occurs between ignition and the dropping of the molten metal. Such delay results in completion of the reaction for all of the mixture and also permits any slag formed to rise to the top of the molten metal. Thus any slag formed will be drawn into the weld cavity last and will collect in a riser which may subsequently be removed. Thus if the disk melts through prematurely, slag or unreacted exothermic material or both may be drawn into the critical portion of the weld cavity, adversely affecting the quality of the weld.

In addition to the above outlined problems of hot wire remote electrical ignition of exothermic materials, there is the problem of the power source. Many exothermic welding procedures are conducted in the field where portable electrical power may not readily be available. In the past automobile batteries have been used for such purposes but such batteries are really not readily portable. Moreover, such batteries and circuits don't provide reliable ignition.

It is therefore desirable to provide a reliable low cost remote electrical ignition system for exothermic materials which does not require starting material, and one which utilizes a lightweight and hand portable power source. Moreover, it is important that when the process is used to form welds, it is desirable the ignition occur over substantially the top surface of the mixture so that the problems noted with single point ignition are avoided.

SUMMARY OF THE INVENTION

Exothermic reaction mixtures are economically ignited remotely and electrically without the use of a low ignition starting material by creating a predetermined spark gap within a matrix of such mixture and then impressing a high energy spark across the gap through the use of a capacitor discharge circuit. The mixture is contained in a graphite or ceramic vessel or crucible and is supported over a tap hole or runner by a fusible metal disk. The material of the vessel is preferably graphite which is electrically conductive. In one form of the invention, an insulated wire with a bare tip is positioned just below the top surface of the mixture and the tip spaced a predetermined distance from the wall of the vessel. The capacitor discharge circuit is then employed to fire a high energy spark through a matrix of the material across the gap formed between the wire and vessel to initiate the reaction. The end of the wire may be prebent to an S shape form to facilitate the placement of the wire tip to establish the correct spark gap. In another form the spark gap may be established in a small cylindrical cartridge containing the material. The cartridge may be positioned in side wall of the mold just below or near the top of the exothermic material so that it can be filled with the material from the main body of the exothermic material. The cartridge may be conductive and include one coaxial wire to form the spark gap or it may be nonconductive and include two wires positioned to form a suitable gap. The cartridge may be prefilled with exothermic material and the open end covered to facilitate handling. The cartridge may also include a small amount of organic, hydrated or aqueous material adjacent to the weld metal which upon spark and ignition expands to expel the ignited exothermic material from the open end of the cartridge in the form of a spray. The cartridge may be positioned to reflect such sprayed ignited material from a vessel cover over the entire top surface of the main body of exothermic material. Alternatively the cartridge may be positioned in the cover to spray the ignited material directly on the top surface. In this manner the problems of single point ignition are avoided.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figures 1, 2:
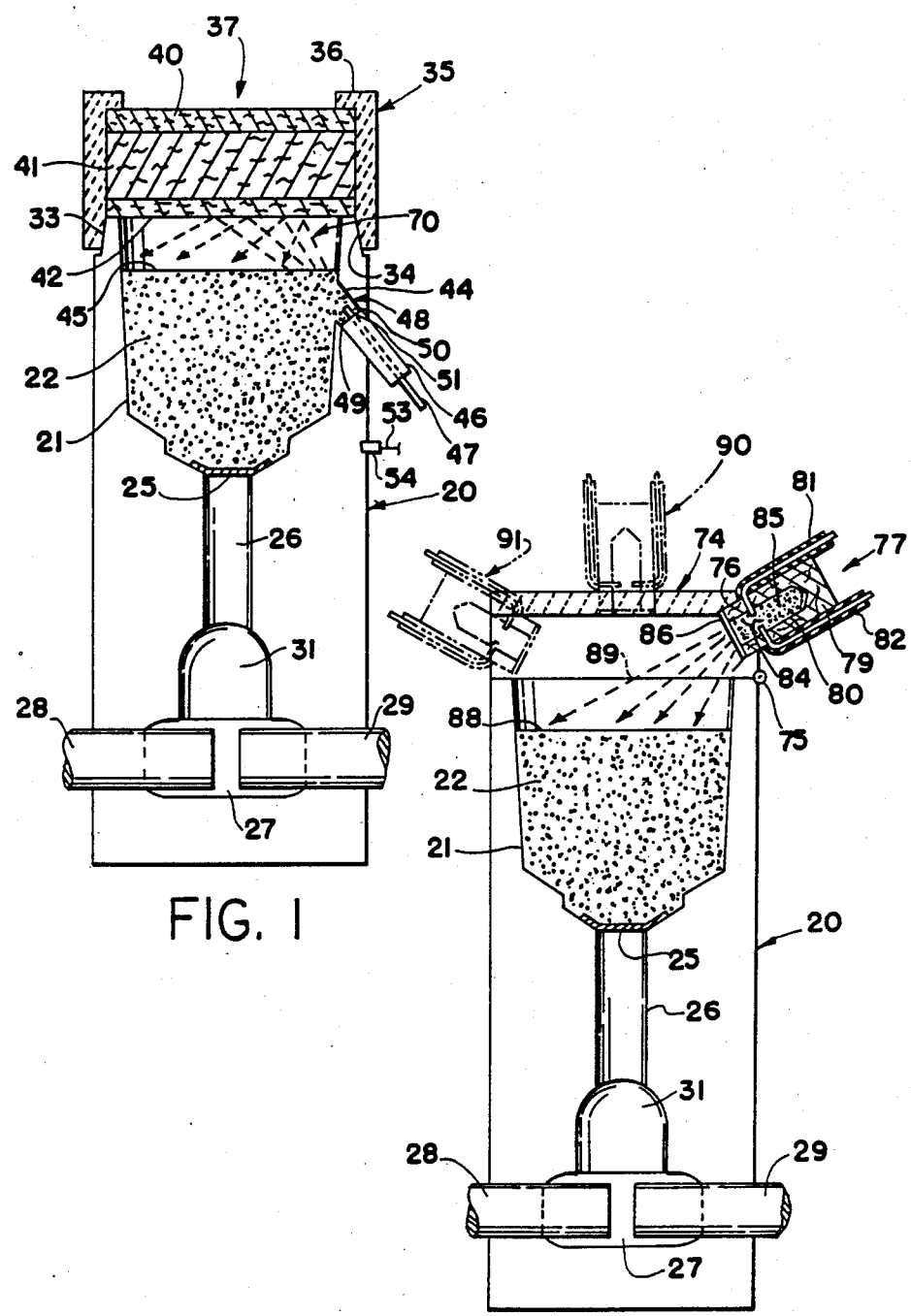
FIG. 1 is an elevation partially in section of exothermic welding apparatus in accordance with the present invention.
FIG. 2 is a similar elevation of another form of the invention with the ignition cartridge placed in the cover, alternative positions for the cartridge being shown in dotted lines.

Referring initially to FIG. 1 there is illustrated mold block 20 forming a vessel or crucible which includes an enlarged crucible chamber 21 at the top which is filled with an exothermic material 22. The mold is formed by a graphite material and usually in two halves which are split down the middle and held together by a suitable clamp or clamps not shown. The mold parts are normally rectangular in exterior configuration while the configuration of the chamber and passages hereafter described is generally circular.

The chamber 21 opens at the top of the mold and the bottom of the chamber is closed by one or more metal disks indicated at 25 positioned above a tap hole passage 26 which communicates with a weld chamber 27 in which the ends 28 and 29 of items to be welded are positioned. Such items may be rods or cables which are to be welded by the process illustrated. The chamber 27 includes an enlarged top portion or slag cavity 31 which creates a hot topping of slag which is subsequently removed.

At the top of the mold there is provided a tapered annular surface 33 which receives the tapered annular surface 34 on the inside lower edge of annular filter assembly ring 35. The ring 35 is provided with a top flange 36 which captures a multilayered filter assembly 37 between the flange and the top of the mold. The filter assembly may include an upper layer 40 of carbon fiber material, a middle layer 41 of a material such as FIBREFAX and a lower layer 42 superjacent the crucible chamber 21 containing the exothermic material 22. The lower filter layer 42 is preferably of the carbonaceous type and is designed directly to resist molten metal splatter from the exothermic reaction which takes place in the chamber below. Reference may be had to the copending application of Dennis Brosnan et al Ser. No. 030,169, filed Mar. 25, 1987, entitled "Exothermic Welding Apparatus and Method", for a more complete disclosure of the materials which may be employed in the filter assembly.

In the embodiment of FIG. 1 the filter assembly comprises the cover and substantially contains the smoke, fumes and spatter which normally accompany exothermic processes or exothermic welding.

In the embodiment of FIG. 1 a hole illustrated at 44 is drilled in the side wall of the crucible or mold. The hole extends upwardly at an angle and the axis of the hole is directed approximately at the center under-surface of the cover or lower filter element 42. The hole is drilled in the side wall of the mold just below the normal top surface indicated at 45 for the exothermic material.

Plugging the hole from the exterior is a noncombustible electrical insulator 46. A wire 47 projects axially through the insulator and extends slightly beyond the insulator in the angled chamber 48 as indicated at 49 forming a controlled spark gap between the projecting end of the wire and the conductive wall of the mold. When the crucible chamber is filled with the exothermic material, the material will also fill the smaller offset chamber 48 so that the spark gap 50 is then within a matrix of the exothermic material. A small amount of organic, hydrated or aqueous material is positioned at the spark gap as indicated at 51.

Figure 7:
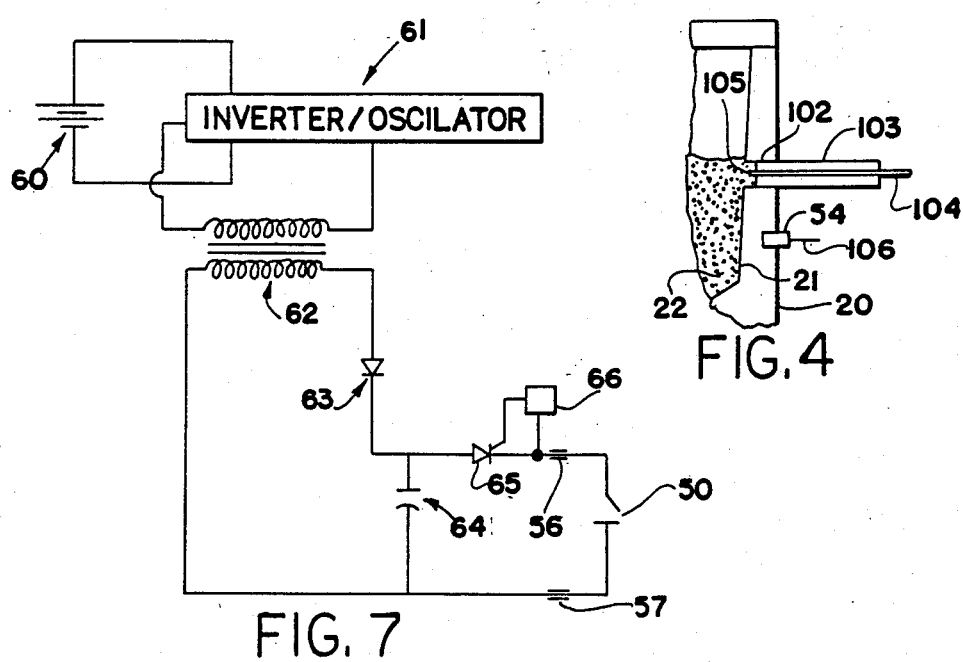
FIG. 7 is a schematic illustration of the high energy spark generating circuit.
Figure 8:
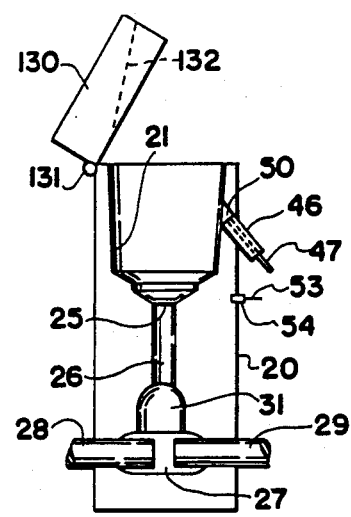
FIGS. 8–11 are sequence illustrations showing the formation of a weld with the present invention.
Figure 9:
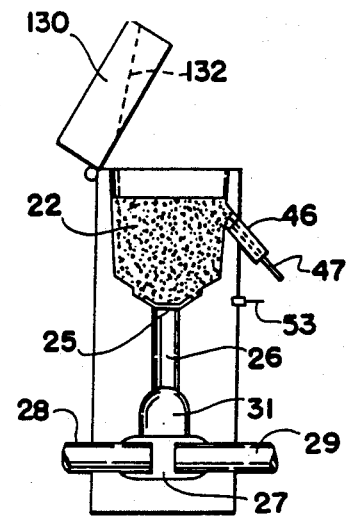

With the exothermic material in place forming a matrix of such exothermic material at the spark gap, the filter assembly is then put in position and the wire 47 is connected to the circuit seen in FIG. 7. Another wire 53 is connected to projecting lug 54 on the mold body and both wires are connected to the circuit seen in FIG. 7 through convenient connectors seen at 56 and 57 in such Figure.

Referring now to such circuit it will be seen that power source for the circuit may comprise a battery 60 such as a 6-volt battery which is connected to an inverter or oscillator 61 which converts the DC current to a high frequency AC current. The output of the inverter than passes through a step-up transformer seen at 62 which converts the 6-volt AC current to approximately 450 volts. The high voltage AC current is then passed through a rectifier 63 (full wave or half wave) to convert the AC current back to DC current. The DC current then charges a capacitor 64. When the switch 65 is closed a high energy spark is formed at the spark gap 50. The switch 65 can be mechanical or solid state. The solid state switch is closed by the gate firing circuit 66.

Referring back now to FIG. 1, when the capacitor is discharged and the high energy spark is created across the spark gap within the matrix of exothermic material, such material is ignited and the small amount of organic, hydrated or aqueous material at the spark gap causes the ignited exothermic material to spray upwardly as indicated by the arrows 70 reflecting off the undersurface of the lower layer of filter material and spraying such molten reaction products of the exothermic material over the entire top surface of the exothermic material igniting the bulk of the exothermic material from the top. The exothermic reaction then proceeds from the top of the mixture downwardly and when the molten metal is formed on top of the disk 25 it causes the disk to melt. The molten metal then drops through the tap hole 26 into the weld cavity 27 welding the parts 28 and 29 together.

The circuit seen in FIG. 7 is quite small and compact and even including two 3-volt batteries may be hand held. The connectors may conveniently be plug, screw clamp, or alligator type connections, for example.

Referring now to FIG. 2 there is illustrated a similar graphite mold for welding items 28 and 29 exothermically with the exothermic material positioned in the crucible 21 on top of metal disk 25.

The mold 20 instead of being provided with a filter assembly as in FIG. 1 is provided with a hinged cover seen at 74 hinged to the top of the mold at 75.

The cover includes an angled cylindrical hole 76 which receives an ignition cartridge shown generally at 77. The ignition cartridge includes a wooden cylindrical insulator housing 79 in which is formed a cylindrical chamber 80 opening only at one axial end. Insulated wires 81 and 82 extend along the outside of the insulator and project inwardly through holes in the wall with their bare projecting ends forming a spark gap seen at 84. The chamber 80 is filled with exothermic material as indicated at 85 and the open end of the chamber is closed with a cap of combustible or frangible tape 86. The wires projecting through the wall of the insulator may be held in place with glue which may serve as a small amount of organic material and also serves to hold the wires in place during formation of the cartridge. The wood itself contains sufficient organic material that the glue, but for the assembly requirement, may be omitted.

When the exothermic material is placed in the crucible 21 and the cover is closed the wires 81 and 82 are connected to the circuit shown in FIG. 7 in the same manner as the wires 47 and 53. When the switch 65 is closed a high energy spark is created across the gap 84 and the matrix of exothermic material in the cartridge is ignited with the organic, hydrated or aqueous material causing the ignited material to be sprayed from the open end of the chamber disintegrating the tape cap and spraying over the top surface 88 of the main body of exothermic material as indicated by the arrows 89. The angle of mounting of the cartridge in the cover is such that the ignited exothermic material in the cartridge will be sprayed substantially uniformly over the entire top surface of the exothermic material in the crucible. Other positions for the cartridge in the mold cover may be employed such as illustrated by the phantom line positions 90 and 91.

It should be noted that the embodiment of FIG. 2 does not utilize the conductive nature of the graphite material to form the high energy spark and that the matrix of exothermic material in which the spark is created is remote from the main body of exothermic material.

Figure 3:
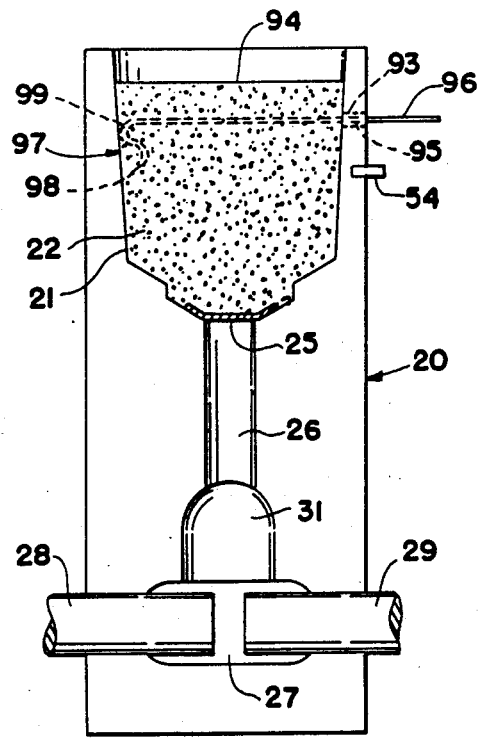
FIG. 3 is a similar illustration of another form of the invention using a bent wire to form the spark gap to obtain a single point ignition.

Referring now to FIG. 3 there is illustrated another embodiment of the present invention. In FIG. 3 there is illustrated a mold 20 which may employ either a filter assembly cover as seen in FIG. 1 or a hinged cover as seen in FIG. 3. A hole 93 is drilled in the side wall of the mold just below the top level 94 of the exothermic material. An insulator 95 may be placed in such hole and insulated wire 96 extends through such insulator. The end of the wire is bent to an S-shape configuration as indicated at 97. The very tip of the wire indicated at 98 is not insulated. When the wire is inserted into the mold the bend of the wire formed by the S-shape configuration engages the side wall of the crucible as indicated at 99 thus spacing the uninsulated tip 98 from the side wall forming the desired spark gap. After the exothermic material is in place and the cover or filter is positioned properly on top of the mold, the wire 96 and the lug 54 are electrically connected to the circuit seen in FIG. 7. The discharge of the capacitor creates a high energy spark between the tip 98 of the wire and the side wall of the mold causing ignition of the exothermic material.

Figure 4:
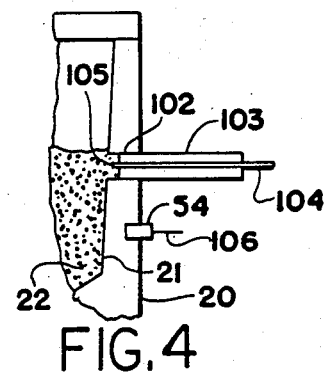
FIG. 4 is a fragmentary illustration of another form of single point ignition.

Referring now to FIG. 4 there is illustrated another form of ignition. The mold 20 has drilled in the crucible side wall a hole 102. The hole may be on a horizontal axis. In such hole is positioned an insulator 103 and a wire 104 projects axially through the insulator to be exposed slightly as indicated at 105. In this manner a controlled spark gap is created between the exposed end of the wire at 105 and the coaxial graphite mold wall of the hole. The wire 104 and the wire 106 connected to the lug 54 are connected to the capacitor discharge high energy spark creating circuit and when the switch is closed the high energy spark across the spark gap will ignite the exothermic material 22.

Figure 5:
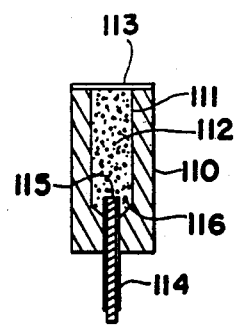
FIG. 5 is an enlarged transverse section of an ignition cartridge in accordance with the present invention.

Referring now to FIG. 5 there is illustrated another form of ignition cartridge. The ignition cartridge may comprise a conductive sleeve 110 with a chamber 111 formed in one end. The chamber may be filled with exothermic material 112 and closed at its open end by a tape cap 113. An insulated wire 114 extends axially through the opposite end of the cartridge and the exposed tip of the wire 115 is in the matrix of exothermic material 112 with the spark gap being formed between the exposed tip and the surrounding wall of the conductive sleeve. Again a small dab of organic, hydrated or aqueous material may be positioned at the spark gap as indicated at 116. The ignition cartridge is then placed in the proper position in the mold or mold cover as illustrated in FIGS. 1 and 2, respectively.

Figure 6:
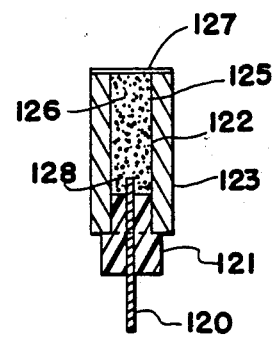
FIG. 6 is a similar illustration of another form of cartridge.

In FIG. 6 there is illustrated a cartridge utilizing a bare wire 120 which extends through an annular stepped electrical insulator 121 with the smaller diameter portion thereof fitting within annular bore 122 of conductive sleeve 123. The wire 120 projects slightly from the interior of the insulator within chamber 125. The chamber is filled with exothermic material 126 and closed by the tape cap 127. In this manner the spark gap is formed between the exposed wire and the conductive sleeve. Again a small amount of organic or the like material may be positioned at the spark gap as indicated at 128 to cause the ignited exothermic material to spray from the open end of the chamber through the tape cap 127. When conductive sleeve inserts are positioned in graphite molds, good electrical contact between the graphite mold and the conductive sleeve is required. Otherwise the other lead of the spark gap circuit must be connected directly to the conductive sleeve.

Referring now to FIGS. 8-11 there is illustrated a welding process in accordance with the present invention utilizing the mold 20 and a hinged cover 130 hinged to the top of the mold as seen at 131. The interior of the cover is cut away as indicated at 132 to provide an angled undersurface to the cover and also to provide a lateral chimney through which in conventional apparatus the low ignition starting material is normally ignited. In FIGS. 8-11 there is illustrated the angled ignition system of FIG. 1 which includes the organic material 51 at the spark gap 50.

Figure 10:
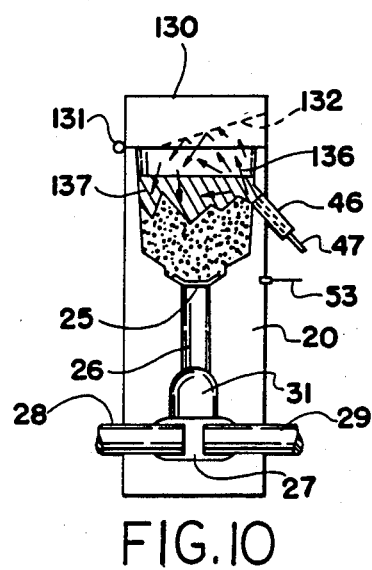
Figure 11:
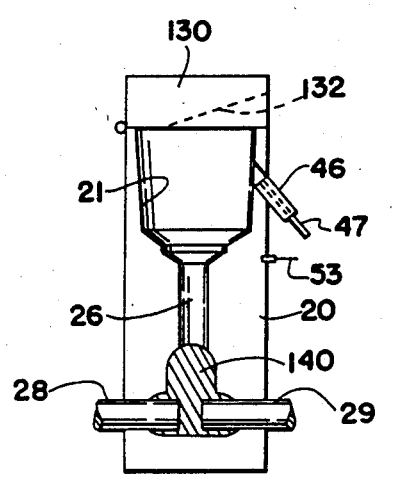

With the mold cover open, the disk 25 is placed at the top of the tap hole 26 and exothermic material 22 is placed in the crucible chamber on top of the disk. When placing the exothermic material in the molds, the user may flick some of the material at the top to ensure that the spark gap 50 is in a matrix of such material. The cover 130 is now closed and as seen in FIG. 10 the wires 47 and 53 are connected to the circuit seen in FIG. 7 and the high energy spark ignites the material at the spark gap with the organic or like material causing the ignited exothermic material to spray upwardly as indicated by the arrows 136 in FIG. 10 reflecting ignited exothermic material from the undersurface of the cover thus spreading the ignited materials over the entire top surface of the exothermic material 22. The reaction then begins at the top of the contained exothermic material with molten metal forming as indicated at 137. The reaction continues until the entire crucible is filled with molten metal and the heat from the molten metal then causes the disk 25 to melt or fuse permitting the molten metal to drop through the tap hole 26 into the weld cavity 27. Because of the slight delay, all of the exothermic material is reacted thus avoiding any such unreacted material being drawn into the weld cavity, and any slag formed in the process rises to the top to be drawn through the tap hole 26 last to be collected in slat cavity 140. When the weld connection cools sufficiently, the mold is opened and the welded items removed. The slag riser also serves as a hot topping ensuring that a proper weld connection is made and that the weld connection properly cools. The slag riser is subsequently removed.

Typical exothermic reaction mixtures with which the present invention is useful are copper oxides plus aluminum or aluminum/copper alloy, iron oxides plus aluminum, tin oxides plus aluminum, or nickel oxides plus aluminum. More than one type of the metal oxide may be included. When the exothermic material is ignited, it produces sufficient heat to sustain and propagate a reaction in the mixture. The typical reaction is between the transition metal oxide and aluminum producing a superheated molten metal and aluminum oxide. For example, the reaction between iron oxide and aluminum produces superheated molten iron and aluminum oxide. Molten iron of higher density may be used to weld or mechanically join iron or steel shapes. The lighter aluminum oxide or slag which forms in the slag cavity is broken off and discarded. A wide variety of additives may be included in the exothermic mixture depending upon the metal or alloy desired. Such exothermic mixtures and the graphite molds and attendant apparatus for using such mixtures are available from Erico Products Inc. of Solon, Ohio, U.S.A. under the trademark CADWELD.

As indicated, for the molds and crucibles, the preferred material is graphite which is electrically conductive. If other ceramic materials are employed, they may be modified with appropriately placed metal strips, conductive inks or sleeves for electrical conductivity.

For an igniter such as shown in FIGS. 1, 4 and 8–11, the preferred material for the insulator is glass. Other materials may include low-purity ceramics such as alumina or mullite, wood, or wood sealed with paint, or a high temperature plastic.

For the wire of the igniter the preferred material depends on the insulator. Materials for the wire may be plain or tinned copper wire or DUMET wire which is wire made such that its thermal expansion coefficient is similar to that of glass, steel wire, or stainless steel wire. If the insulator is glass, the DUMET wire is preferred. If the insulator is ceramic, wood, or plastic, plain copper wire is preferred.

For the small amount of organic material which causes the spray, again the preferred material depends on the insulator. Organic materials may include acrylic paint, latex paint, paint with an oil or organic base, epoxy paint, ore organic-based glue. If glass is employed as the insulator, an epoxy paint is preferred. If wood or ceramic is used as the insulator, glue is preferred since it may also serve to anchor the wire during shipment. If certain plastics are employed, no organic material may be needed. Hydrated sodium silicate or silicate based paint, or aqueous materials, while useful, may present problems in manufacture and shipment if excess drying occurs.

Igniters illustrated in FIGS. 2, 5 and 6 may be used in applications where the other illustrated igniters are not practical as in instances where space around the mold is a consideration. In FIG. 2 the preferred insulator material is wood sealed with paint. Other materials which may be used include high temperature plastic, or low-grade ceramic coated with an organic sealer. The wires are preferably insulated copper wire although other materials may include uninsulated copper, or insulated or uninsulated steel or stainless steel wires.

The exothermic material in the igniter may be the same as the main body of exothermic material although the precise composition of the exothermic material in the igniter need not be the same as the main body of exothermic material.

The frangible cap on the igniter is preferably a paper tape, either adhesive-backed or formed so as to seal the exothermic material inside the igniter. Other types of tape may be employed such as plastic or cellophane tape.

In FIGS. 5 and 6 the preferred conductive sleeve is graphite although other sleeves or cases for the cartridge may include metal or even ceramic with appropriate metal strips. The insulated wire is preferably PVC-coated plain copper wire although other wires may be employed such as plastic coated or ceramic coated wire made of steel or stainless steel.

In FIGS. 3 and 4 the preferred insulator would be glass or the same as in connection with the other illustrated embodiments. In FIGS. 3 and 4 the preferred wire would be a "magnet" wire which is a copper wire with a very thin varnish used for insulation. Other materials may include a plain copper wire dipped in a ceramic at the "S" bend where it contacts the mold.

It can now be seen that there is provided an exothermic process and apparatus which utilizes a remote electrical ignition system for igniting exothermic mixtures without the use of low-ignition energy mixtures such as the aforenoted starting materials.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of welding at least one part with exothermic material comprising the steps of forming a spark gap in a matrix of such material, then creating a high energy spark across such gap sufficient to initiate and sustain an exothermic reaction of such material until such material is converted to molten metal, and directing such molten metal to a location surrounding said part to be welded.

2. A method as set forth in claim 1 wherein such high energy spark is created by a capacitor discharge electrical circuit.

3. A method as set forth in claim 2 wherein such capacitor discharge electrical circuit is battery operated and portable.

4. A method as set forth in claim 3 wherein such circuit includes a DC to AC inverter, a step up transformer and an AC to DC rectifier.

5. A method as set forth in claim 1 wherein such exothermic material is contained in a conductive crucible, said crucible being one electrode of such spark gap.

6. A method of converting exothermic material to molten metal comprising the steps of forming a spark gap in a matrix of such material, and then creating a high energy spark across such gap sufficient to initiate and sustain an exothermic reaction of such material wherein such matrix of exothermic material is contained in a small ignition cartridge and is expelled from such cartridge when ignited in turn to ignite a larger body of exothermic material.

7. A method as set forth in claim 6 wherein such cartridge is aimed to spray ignited exothermic material over the top surface of such larger body.

8. A method as set forth in claim 7 wherein such cartridge is aimed at a cover over such larger body to reflect over the top surface of such larger body.

9. A method as set forth in claim 6 wherein such cartridge is positioned just below the top surface of such larger body and is aimed upwardly.

10. A method as set forth in claim 9 wherein such cartridge is positioned in a side wall of a crucible for such larger body of exothermic material and is aimed at an angle toward the center of a cover for such crucible.

11. A method as set forth in claim 10 wherein said crucible is conductive and forms one electrode of such spark gap.

12. A method as set forth in claim 10 wherein such cover comprises a filter assembly.

13. A method as set forth in claim 6 wherein such small ignition cartridge comprises a housing containing the exothermic material, such housing being conductive and forming one electrode of such spark gap.

14. A method as set forth in claim 13 wherein a wire in the center of the housing forms the other electrode of such spark gap.

15. A method as set forth in claim 14 wherein such wire extends through an insulator at one end of such housing, the other end of such housing being closed by a frangible cap to contain such small amount of exothermic material.

16. A method as set forth in claim 6 wherein such small ignition cartridge comprises a cylindrical housing containing the exothermic material which is closed at one end and covered with a frangible cap at the other end.

17. A method as set forth in claim 16 wherein spaced wires extend through the wall of the housing to form the spark gap.

18. A method as set forth in claim 17 wherein such housing is formed of wood.

19. A method as set forth in claim 6 wherein such larger body of exothermic material is contained in a crucible, such ignition cartridge being mounted in a cover for such crucible and being aimed at the top surface of such larger body.

20. A method as set forth in claim 6 wherein the exothermic material in such small ignition cartridge is physically separated from such larger body.

21. A method as set forth in claim 6 wherein the exothermic material in such small ignition cartridge is contiguous with such larger body.

22. A method as set forth in claim 6 wherein such small ignition cartridge contains a gas generating material which causes the exothermic material contained therein to be expelled and sprayed therefrom upon ignition.

23. A method as set forth in claim 22 wherein such gas generating material is an organic material.

24. A method as set forth in claim 23 wherein such organic material is selected from the group consisting of acrylic paint, epoxy paint, latex paint, oil base paint and organic base glue.

25. A method as set forth in claim 22 wherein such gas generating material is a hydrate or aqueous material and such gas is vapor.

26. A method as set forth in claim 22 wherein the gas generating material is incorporated in a housing for the ignition cartridge.

27. The combination set forth in claim 26 wherein said high energy spark is generated by a capacitor discharge electrical circuit.

28. The combination set forth in claim 27 wherein said capacitor discharge electrical circuit is battery operated and hand portable.

29. The combination set forth in claim 28 wherein said circuit includes a DC to AC inverter, a step up transformer, and an AC to DC rectifier to charge the capacitor.

30. The combination set forth in claim 26 wherein said crucible or cover is conductive and forms one electrode of said spark gap.

31. The combination set forth in claim 30 wherein the other electrode is formed by a wire having a non-insulated tip spaced a predetermined distance from said crucible or cover.

32. The combination set forth in claim 31 wherein said wire is insulated and is bent at its end to space its tip such predetermined distance from the wall of the crucible.

33. The combination set forth in claim 31 wherein said wire extends through an insulating sleeve in a cylindrical hole in a side wall of said crucible with the tip projecting inwardly of the insulator and spaced by the insulator a predetermined distance from the wall of the crucible.

34. The combination set forth in claim 33 wherein said insulator is both an electric and refractory insulator.

35. The combination set forth in claim 34 wherein said insulator is a circular cylindrical sleeve of glass.

36. In combination a crucible and cover containing an exothermic reaction material mixture, ignition device means positioned in the crucible-cover combination including a spark gap, and exothermic reaction mixture material within the gap, and means to impress a high voltage across the gap to create a sufficiently high energy spark to ignite such exothermic reaction material in turn to ignite the exothermic reaction mixture in the crucible.

37. The combination set forth in claim 36 wherein said ignition means is positioned in the wall of the crucible just below the level of the exothermic reaction material.

38. The combination set forth in claim 36 wherein said ignition device means includes means to spray ignited exothermic material over the top surface of said material.

39. The combination set forth in claim 36 wherein said ignition device means contains a small body of exothermic reaction mixture adapted to be sprayed over the top surface of a main body of such material upon ignition.

40. The combination set forth in claim 39 wherein said small body is contiguous with said main body.

41. The combination set forth in claim 39 wherein said small body is separated from said main body.

42. The combination set forth in claim 39 wherein said ignition device means includes means to spray ignited exothermic material when such high energy spark is created.

43. The combination set forth in claim 42 wherein said last mentioned means comprises a small amount of gas generating material at the spark gap.

44. The combination set forth in claim 43 wherein said gas generating material is organic and is selected from the group consisting of acrylic paint, epoxy paint, latex paint, oil base paint and organic base glue.

45. The combination set forth in claim 43 wherein said gas generating material is a hydrate or aqueous material and such gas is vapor.

46. The combination set forth in claim 43 including a housing for said ignition device means, said gas generating material being incorporated in said housing.

47. An igniter for exothermic material comprising a housing containing exothermic material which is closed at one end and has a frangible cap at the other end, and a spark gap within said housing within said exothermic material, whereby when a high energy spark is created at such spark gap the exothermic material is ignited.

48. An igniter as set forth in claim 47 including means in said housing to expel ignited exothermic material through said frangible cap shortly after such high energy spark is created.

49. An igniter as set forth in claim 48 wherein said last mentioned means comprises a small amount of a gas generating material at such spark gap.

50. An igniter as set forth in claim 49 wherein said gas generating material is organic.

51. An igniter as set forth in claim 50 wherein said organic material is selected from the group consisting of acrylic paint, epoxy paint, latex paint, oil base paint and organic base glue.

52. An igniter as set forth in claim 49 wherein said gas generating material is a hydrate or aqueous material and such gas is vapor.

53. An igniter as set forth in claim 49 wherein said gas generating material is incorporated in said housing.

54. An igniter as set forth in claim 47 wherein said housing is cylindrical and conductive and forms one electrode of such spark gap.

55. An igniter as set forth in claim 54 wherein said housing is closed at one end by an insulator with a wire extending coaxially therethrough.

56. An igniter as set forth in claim 47 including a capacitor discharge circuit for generating such high energy spark.

57. An igniter as set forth in claim 56 wherein said circuit is battery operated and hand portable.

58. An igniter set forth in claim 57 wherein said circuit includes a DC to AC inverter, a step up transformer and an AC to DC rectifier to charge the capacitor.

59. A method of igniting an exothermic reaction mixture contained in a crucible comprising the steps of creating a high energy spark within a matrix of a small amount of such reaction mixture, such that when such small amount of reaction mixture ignites it is caused to spray molten reaction products onto the exothermic reaction mixture contained in the crucible thereby igniting the same.

60. A method of igniting an exothermic reaction mixture contained in a crucible comprising the steps of forming a spark gap within such reaction mixture, and then impressing a high energy spark across such gap to ignite such reaction mixture.

* * * * *